United States Patent
Lee et al.

(10) Patent No.: US 10,397,813 B2
(45) Date of Patent: Aug. 27, 2019

(54) COMMUNICATION DEVICE AND METHOD OF CONTROLLING SAME

(71) Applicants: Hae-Chul Lee, Gyeonggi-do (KR); Min-Goo Kim, Gyeonggi-do (KR); In-Hyoung Kim, Gyeonggi-do (KR); Joo-Hyun Do, Seoul (KR)

(72) Inventors: Hae-Chul Lee, Gyeonggi-do (KR); Min-Goo Kim, Gyeonggi-do (KR); In-Hyoung Kim, Gyeonggi-do (KR); Joo-Hyun Do, Seoul (KR)

(73) Assignee: Samsung Electronics Co., Ltd (KR)

( * ) Notice: Subject to any disclaimer, the term of this patent is extended or adjusted under 35 U.S.C. 154(b) by 90 days.

(21) Appl. No.: 15/080,870

(22) Filed: Mar. 25, 2016

(65) Prior Publication Data

US 2017/0111812 A1    Apr. 20, 2017

(30) Foreign Application Priority Data

Oct. 20, 2015 (KR) .................. 10-2015-0146227

(51) Int. Cl.
*H04W 24/08* (2009.01)
*H04B 7/06* (2006.01)
(Continued)

(52) U.S. Cl.
CPC .......... *H04W 24/08* (2013.01); *H04B 7/0626* (2013.01); *H04B 17/318* (2015.01); *H04L 5/0048* (2013.01); *H04B 17/327* (2015.01)

(58) Field of Classification Search
CPC ..... H04B 7/0626; H04L 5/0048; H04W 24/08
See application file for complete search history.

(56) References Cited

U.S. PATENT DOCUMENTS 8,634,363 B2  1/2014 Kim et al.
9,143,207 B2  9/2015 Kim et al.
(Continued)

FOREIGN PATENT DOCUMENTS

CN  103053196  4/2013
WO  WO 2014/062029  4/2014
WO  WO 2015/047742  4/2015

OTHER PUBLICATIONS

German Search Report dated Nov. 28, 2016 issued in counterpart application No. 102016208892.0, 18 pages.
(Continued)

*Primary Examiner* — Asad M Nawaz
*Assistant Examiner* — Syed Ali
(74) *Attorney, Agent, or Firm* — The Farrell Law Firm, P.C.

(57) ABSTRACT

Apparatuses, methods, and systems of measuring received power are described, including apparatuses, methods, and systems which can measure received power, even when the subcarrier offset of the measurement bandwidth is different from the subcarrier bandwidth of the cell bandwidth. In one method, the first received power of a plurality of Resource Blocks (RBs) received from a second Base Station (BS) are measured based on first channel state information received from a first BS. Based on the determination whether a value of an index included in the first channel state information is larger than a predetermined value, at least one of second received power, third received power, and fourth received power of the plurality of RBs is measured by using second channel state information including an alternative index determined based on the first channel state information based on a result of the determination.

14 Claims, 11 Drawing Sheets

(51) Int. Cl.
*H04L 5/00* (2006.01)
*H04B 17/318* (2015.01)
*H04B 17/327* (2015.01)

(56) References Cited

U.S. PATENT DOCUMENTS

| | | | | |
|---|---|---|---|---|
| 2009/0005030 A1* | 1/2009 | Han | ............ | H04W 48/16 |
| | | | | 455/423 |
| 2011/0158191 A1* | 6/2011 | Zhang | ............ | H04L 5/003 |
| | | | | 370/329 |
| 2011/0199986 A1* | 8/2011 | Fong | ............ | H04L 5/0035 |
| | | | | 370/329 |
| 2011/0228735 A1* | 9/2011 | Lee | ............ | H04L 5/0051 |
| | | | | 370/329 |
| 2013/0039199 A1 | 2/2013 | Liao et al. | | |
| 2013/0196675 A1* | 8/2013 | Xiao | ............ | H04W 72/082 |
| | | | | 455/452.1 |
| 2014/0211730 A1* | 7/2014 | Seo | ............ | H04L 5/0053 |
| | | | | 370/329 |
| 2014/0273861 A1* | 9/2014 | Abdelmonem | ....... | H04L 5/0026 |
| | | | | 455/63.1 |
| 2014/0307576 A1* | 10/2014 | Nagata | ............ | H04L 1/0001 |
| | | | | 370/252 |
| 2014/0362793 A1 | 12/2014 | Chal et al. | | |
| 2015/0043368 A1 | 2/2015 | Kim et al. | | |
| 2015/0043372 A1 | 2/2015 | Nagata et al. | | |
| 2015/0341153 A1 | 11/2015 | Jongren et al. | | |
| 2017/0202014 A1* | 7/2017 | Moon | ............ | H04B 7/0626 |
| 2017/0373738 A1* | 12/2017 | Chae | ............ | H04L 5/00 |
| 2017/0373741 A1* | 12/2017 | Yang | ............ | H04L 1/18 |

OTHER PUBLICATIONS

Taiwanese Office Action dated Jun. 17, 2019 issued in counterpart application No. 105111727, 13 pages.

* cited by examiner

| NCP | | | | | | ECP | | | | |
|---|---|---|---|---|---|---|---|---|---|---|
| CSI configuration | SUBCARRIER OFFSET k | SYMBOL l | ns mod 2 | ALTERNATIVE SUBCARRIER OFFSET (k+6)%12 | ALTERNATIVE CSI-RS configuration | CSI configuration | SUBCARRIER OFFSET k | SYMBOL l | ns mod 2 | ALTERNATIVE SUBCARRIER OFFSET (k+6)%12 | ALTERNATIVE CSI-RS configuration |
| 0 | 9 | 5 | 0 | 3 | 10 | 0 | 11 | 4 | 0 | 5 | 4 |
| 1 | 11 | 2 | 1 | 5 | 12 | 1 | 9 | 4 | 0 | 3 | 5 |
| 2 | 9 | 2 | 1 | 3 | 14 | 2 | 10 | 4 | 1 | 4 | 6 |
| 3 | 7 | 2 | 1 | 1 | 16 | 3 | 9 | 4 | 1 | 3 | 7 |
| 4 | 9 | 5 | 1 | 3 | 18 | 4 | 5 | 4 | 0 | 11 | 0 |
| 5 | 8 | 5 | 0 | 2 | 11 | 5 | 3 | 4 | 0 | 9 | 1 |
| 6 | 10 | 2 | 1 | 4 | 13 | 6 | 4 | 4 | 1 | 10 | 2 |
| 7 | 8 | 2 | 1 | 2 | 15 | 7 | 3 | 4 | 1 | 9 | 3 |
| 8 | 6 | 2 | 1 | 0 | 17 | 8 | 8 | 4 | 0 | 2 | 10 |
| 9 | 8 | 5 | 1 | 2 | 19 | 9 | 6 | 4 | 0 | 0 | 11 |
| 10 | 3 | 5 | 0 | 9 | 0 | 10 | 2 | 4 | 0 | 8 | 8 |
| 11 | 2 | 5 | 0 | 8 | 5 | 11 | 0 | 4 | 0 | 6 | 9 |
| 12 | 5 | 2 | 1 | 11 | 1 | 12 | 7 | 4 | 1 | 1 | 14 |
| 13 | 4 | 2 | 1 | 10 | 6 | 13 | 6 | 4 | 1 | 0 | 15 |
| 14 | 3 | 2 | 1 | 9 | 2 | 14 | 1 | 4 | 1 | 7 | 12 |
| 15 | 2 | 2 | 1 | 8 | 7 | 15 | 0 | 4 | 1 | 6 | 13 |
| 16 | 1 | 2 | 1 | 7 | 3 | 16 | 11 | 1 | 1 | 5 | 19 |
| 17 | 0 | 2 | 1 | 6 | 8 | 17 | 10 | 1 | 1 | 4 | 20 |
| 18 | 3 | 5 | 1 | 9 | 4 | 18 | 9 | 1 | 1 | 3 | 21 |
| 19 | 2 | 5 | 1 | 8 | 9 | 19 | 5 | 1 | 1 | 11 | 16 |
| 20 | 11 | 1 | 1 | 5 | 26 | 20 | 4 | 1 | 1 | 10 | 17 |
| 21 | 9 | 1 | 1 | 3 | 28 | 21 | 3 | 1 | 1 | 9 | 18 |
| 22 | 7 | 1 | 1 | 1 | 30 | 22 | 8 | 1 | 1 | 2 | 25 |
| 23 | 10 | 1 | 1 | 4 | 27 | 23 | 7 | 1 | 1 | 1 | 26 |
| 24 | 8 | 1 | 1 | 2 | 29 | 24 | 6 | 1 | 1 | 0 | 27 |
| 25 | 6 | 1 | 1 | 0 | 31 | 25 | 2 | 1 | 1 | 8 | 22 |
| 26 | 5 | 1 | 1 | 11 | 20 | 26 | 1 | 1 | 1 | 7 | 23 |
| 27 | 4 | 1 | 1 | 10 | 23 | 27 | 0 | 1 | 1 | 6 | 24 |
| 28 | 3 | 1 | 1 | 9 | 21 | | | | | | |
| 29 | 2 | 1 | 1 | 8 | 24 | | | | | | |
| 30 | 1 | 1 | 1 | 7 | 22 | | | | | | |
| 31 | 0 | 1 | 1 | 6 | 25 | | | | | | |

COMMUNICATION DEVICE AND METHOD OF CONTROLLING SAME

PRIORITY

This application claims priority under 35 U.S.C. § 119(a) to Korean Patent Application Serial No. 10-2015-0146227, which was filed in the Korean Intellectual Property Office on Oct. 20, 2015, the entire content of which is incorporated herein by reference.

BACKGROUND

1. Field of the Disclosure

The present disclosure relates generally to a communication device and a method of controlling the same and, more particularly, to a communication device capable of measuring valid (or effective or available) reception power using a Channel State Information Reference Signal (CSI-RS) configuration and a method of controlling the same.

2. Description of the Related Art

The ON/OFF feature of a small cell was introduced for small cell enhancement, and aims at load balancing while reducing power consumption of a small cell station and reducing interference. When there is no User Equipment (UE) being serviced by the small cell, the small cell enters an off state and maintains the off state until there is a UE to be serviced. The small cell transmits a Discovery Reference Signal (DRS), for example, a synchronization signal such as a Primary Synchronization Signal (PSS)/Secondary Synchronization Signal (SSS), a Cell-specific Reference Signal (CRS), or a Channel State Information Reference Signal (CSI-RS) in a time window periodically set by a Discovery Signal Measurement Timing Configuration (DMTC) defined in the 3rd Generation Partnership Project (3GPP) standard to make the UE measure signal quality of an available small cell in the off state.

The UE performs measurement for small cell discovery in a time window by using a DMTC parameter. The UE discovers a frame boundary by using a synchronization signal and measures received power, for example, Reference Signal Received Power (RSRP), by using the CRS or the CSI-RS. In the present disclosure, the bandwidth of the small cell is referred to as the cell bandwidth and the bandwidth for measuring CRS RSRP or CSI-RS RSRP is referred to as the measurement bandwidth. Information related to the measurement bandwidth (sometimes referred to as measurement bandwidth information) is transmitted from a first or macro Base Station (BS) (for example, a macro BS). For LTE (Long Term Evolution) system, the BS is called an eNodeB.

Figure 1:
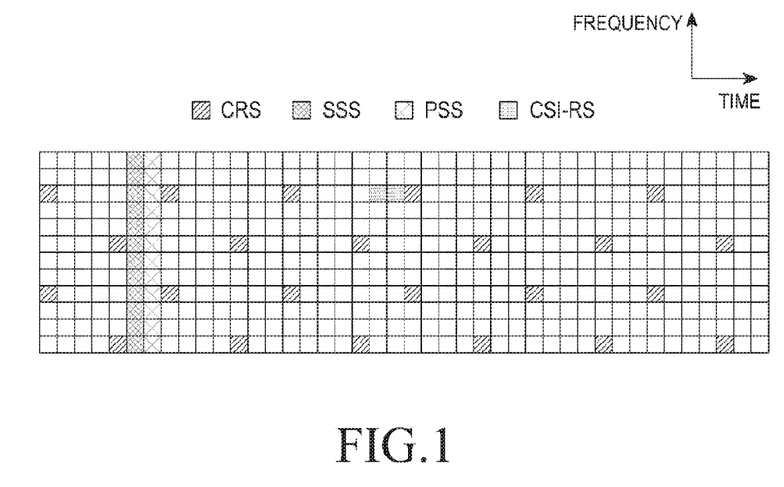
FIG. 1 illustrates an example of a distribution of synchronization signals, CRSs, and CSI-RSs in an LTE frame structure.

FIG. 1 illustrates an example of a distribution of synchronization signals, CRSs and CSI-RSs in an LTE frame structure. The UE measures RSRP by using CRSs of second or smaller BSs (for example, small cells) and by using CSI-RSs by a configuration of the first BS. When received power is measured using the CSI-RS, locations of valid CSI-RSs to be used for measuring the received power are changed according to a combination of the cell bandwidth and the measurement bandwidth and the CSI-RS configuration, so that it is required to consider the combination and the CSI-RS configuration when measuring the received power.

Figure 2A:
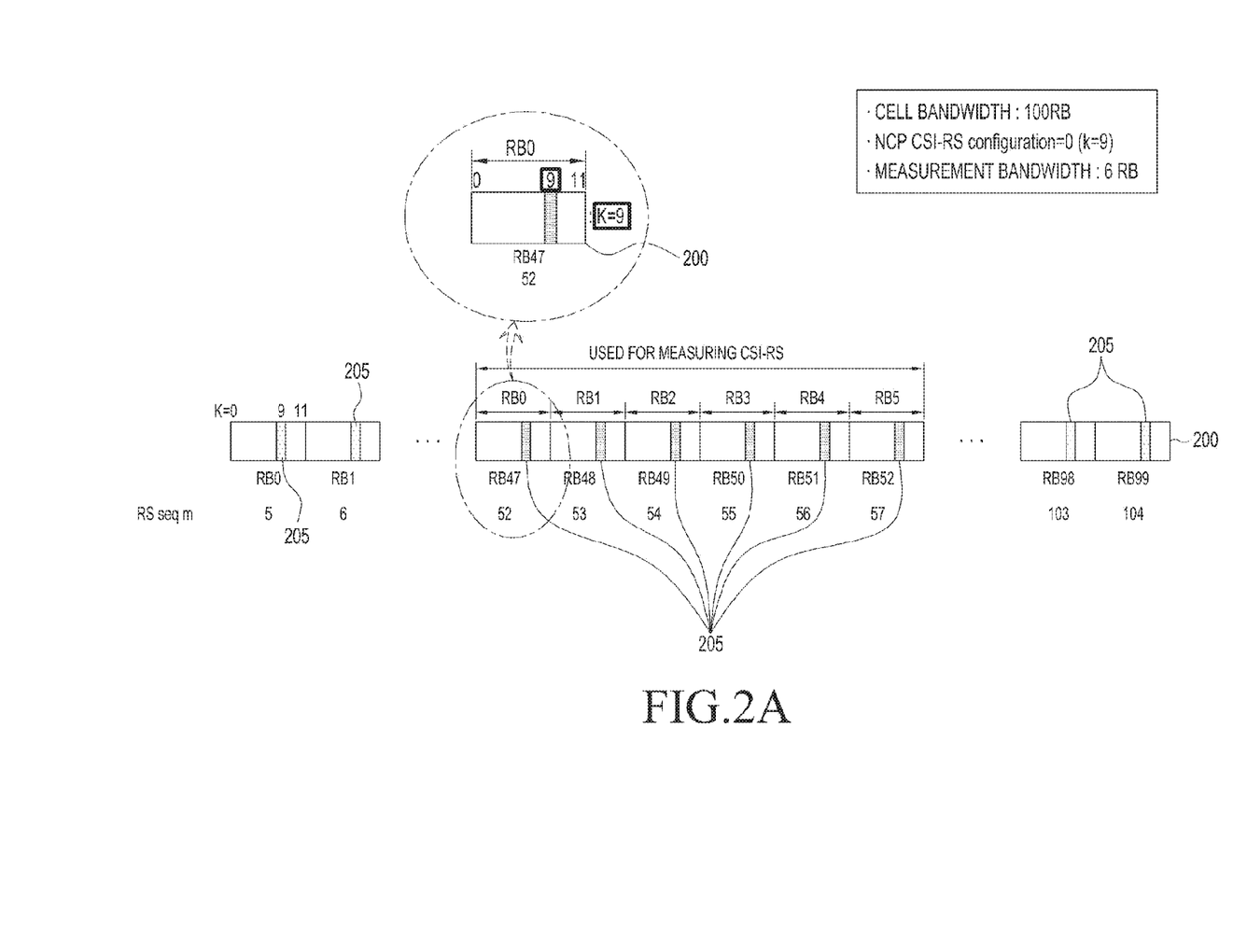
FIGS. 2A and 2B illustrate a problem that may occur when received power is measured without knowledge of the relative locations of CSI-RSs.
Figure 2B:
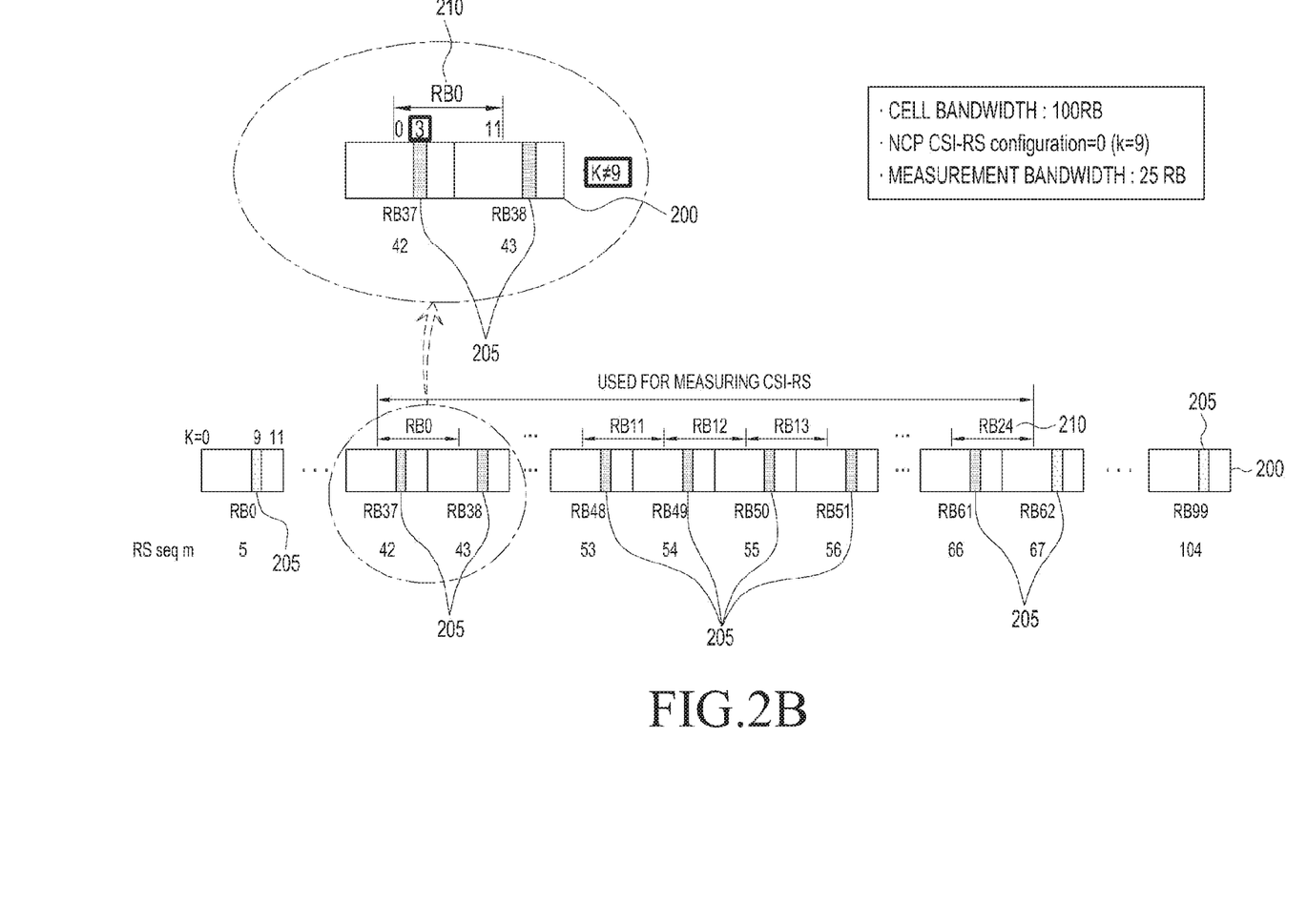

FIGS. 2A and 2B illustrate how a problem may occur when the received power is measured without regard to the locations of CSI-RSs. In FIG. 2A, there is no problem, while FIG. 2B illustrates how a problem may occur.

In FIGS. 2A and 2B, the cell bandwidth of the second BS is 100 Resource Blocks (RBs) (20 MHz), the respective measurement bandwidths are 6 RBs (1.4 MHz) in FIG. 2A and 25 RBs (5 MHz) in FIG. 2B, the Cyclic Prefix (CP) is the normal type, and the CSI-RS configuration is 0 (which has the corresponding subcarrier offset k=9). The "subcarrier offset (k)" may be referred to as the "subcarrier index" or briefly as the "index".

In FIG. 2A, where the CSI-RS configuration is 0 and the subcarrier offset (k) is 9, each CSI-RS 205 is located at a position where the subcarrier offset corresponds to 9 in the series of RBs 200 acquired from the small cell (sometimes referred to as "cell RBs"). Since each CSI-RS 205 is located where the subcarrier offset corresponds to 9 based on the RBs used for measuring the CSI-RS 205 (that is, RB #0 to RB #5, such RBs are sometimes referred to as "measurement RBs"), there is no problem even though the measurement RBs and the cell RBs are different, because they line up.

By contrast, in FIG. 2B, the subcarrier offset (that is, k=3) of the measurement bandwidth is different from the subcarrier offset (that is, k=9) of the cell bandwidth. In this case, because the CSI-RS is acquired to measure the received power, the communication device or the UE may not be able to measure the valid received power. That is, while the subcarrier offset of the CSI-RS 205 signals for the cell RBs 200 is 9, the subcarrier offset corresponding to the location of the CSI-RS 205 signals in terms of the measurement RBs 210 is 3. However, according to conventional methods, the communication device or the UE acquires (in other words, extracts) the CSI-RS 205 at the position (that is, k=9) corresponding to the subcarrier offset indicated by the first BS for the cell RBs 200, and not for the measurement RBs 210. As a result, the correct CSI-RS 205 cannot be acquired and, accordingly, correct received power cannot be measured.

SUMMARY

Aspects of the present disclosure address at least the above-mentioned problems and/or disadvantages and provide at least the advantages described below.

According to various aspects of the present disclosure, communication devices, UEs, methods, and systems are provided which measure valid received power using re-configured (alternative) CSI-RS configurations, sequence shifts, and/or resource block movements/shifts, even when the subcarrier offset of the measurement bandwidth is different from the subcarrier offset of the cell bandwidth.

In accordance with an aspect of the present disclosure, a communication device is provided which includes: a transceiver that receives first channel state information from a first Base Station (BS) and receives a plurality of Resource Blocks (RBs) from a second BS; a memory that stores the first channel state information and second channel state information including an alternative index determined based on the first channel state information; and a processor electrically connected to the transceiver and the memory, wherein the processor measures first received power of the plurality of RBs based on the first channel state information, determines whether a value of an index included in the first channel state information is larger than a predetermined value, and measures at least one received power of second received power, third received power, and fourth received power of the plurality of RBs by using the second channel state information based on a result of the determination.

In accordance with another aspect of the present disclosure, a method is provided for a communications device to measure received power. The method includes measuring first received power of a plurality of Resource Blocks (RBs) received from a second Base Station (BS) based on first channel state information received from a first BS; determining whether a value of an index included in the first channel state information is larger than a predetermined value; and measuring at least one received power of second received power, third received power, and fourth received power of the plurality of RBs by using second channel state information including an alternative index determined based on the first channel state information based on a result of the determination.

In accordance with another aspect of the present disclosure, a method for a User Equipment (UE) including a communication device to measure received power is provided. The method includes measuring first received power of a plurality of Resource Blocks (RBs) received from a second Base Station (BS) based on first channel state information received from a first BS; determining whether a value of an index of the plurality of RBs, included in the first channel state information, is larger than a predetermined value; and measuring at least one received power of second received power, third received power, and fourth received power of the plurality of RBs by using second channel state information including an alternative index determined based on the first channel state information based on a result of the determination.

In accordance with another aspect of the present disclosure, a method of measuring received power is provided, which includes acquiring measurement bandwidth information from a macro Base Station (BS); receiving communications from at least one of one or more small/femto BSs; determining if cell bandwidth information is acquired; if cell bandwidth information is determined to be acquired, determining whether an alternative subcarrier offset is required to determine the received power of the received communications.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Hereinafter, various embodiments of the present disclosure will be described with reference to the accompanying drawings. However, it should be understood that there is no intent to limit the present disclosure to the particular embodiments and/or details disclosed herein; rather, the present disclosure should be construed to cover any modifications, equivalents, and/or alternatives of the embodiments of the present disclosure described herein. In the drawings, similar reference numerals may be used to designate similar constituent elements.

As used herein, the expressions "have", "may have", "include", or "may include" refer to the existence of a corresponding listed feature or item (e.g., numeral, function, operation, or constituent element, such as a component), but do not exclude the existence of one or more additional features or items not listed.

In the present disclosure, the expressions "A and/or B", "at least one of A and/or B", or "one or more of A and/or B" may include all possible combinations of the items listed. For example, the expressions "A and/or B", "at least one of A and B", or "at least one of A or B" refer to all of (1) including at least one A, (2) including at least one B, or (3) including all of at least one A and at least one B.

The ordinal numbers such as "first", "second", "third", and so on used to describe various items in various embodiments of the present disclosure are for purposes of convenience of identification only. Such terms do not signify the order and/or the importance and do not limit the corresponding components in any way. For example, a first user device and a second user device indicate different user devices although both of them are user devices. For example, a first element may be referred to as a second element, and similarly, a second element may be referred to as a first element without departing from the scope of the present disclosure.

It should be understood that when an element (e.g., first element) is referred to as being (operatively, electrically, or communicatively) "connected" or "coupled" to another element (e.g., second element), it may be directly connected/coupled to the other element or another element (e.g., third element) may be interposed between them. In contrast, when an element (e.g., first element) is referred to as being "directly connected," or "directly coupled" to another element (second element), there are no elements (e.g., third element) interposed between them.

The expression "configured to" used in the present disclosure may be used interchangeably with, for example, "suitable for", "having the capacity to", "designed to", "adapted to", "made to", or "capable of" according to the context/situation. The term "configured to" may not necessarily imply "specifically designed to" perform designated tasks in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor, (AP)) that can perform the corresponding operations by executing one or more software programs stored in a memory device.

The terms used herein are merely for the purpose of describing particular embodiments and are not intended to limit the scope of the disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Terms such as those defined in a generally used dictionary should be interpreted to have their contextual meanings in the relevant field of art, and not be interpreted to have ideal or excessively formal meanings unless clearly defined in the present disclosure. Any term used in the present disclosure should not be interpreted to exclude embodiments of the present disclosure.

According to the present disclosure, it is possible to measure received power of communications even when the cell bandwidth is different from the measurement bandwidth.

A communication device and a User Equipment (UE) according to various embodiments will be described with reference to the accompanying drawings. In the present disclosure, the term user may refer to a person who uses the communication device, a device (for example, an artificial intelligence device) which uses the communication device, a person who uses the UE, or a device which uses the UE.

Figure 3A:
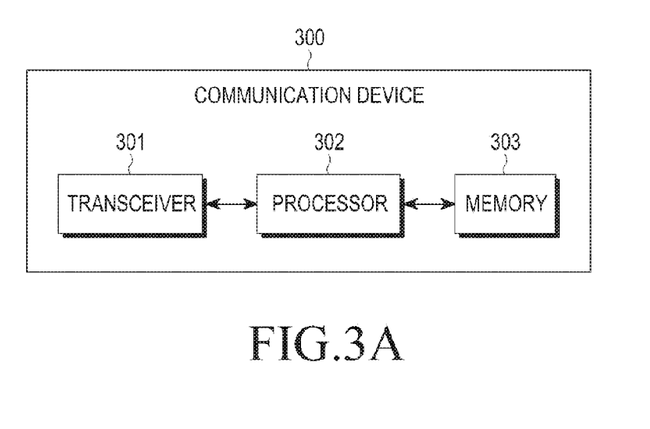
FIG. 3A illustrates an example of a communication device according to various embodiments of the present disclosure.
Figure 3B:
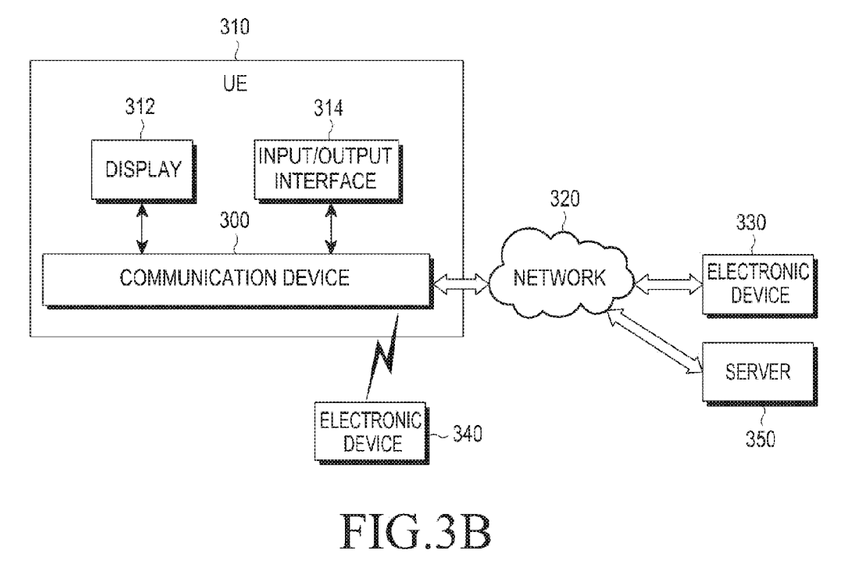
FIG. 3B illustrates an example of a UE including a communication device according to various embodiments of the present disclosure.
Figure 3C:
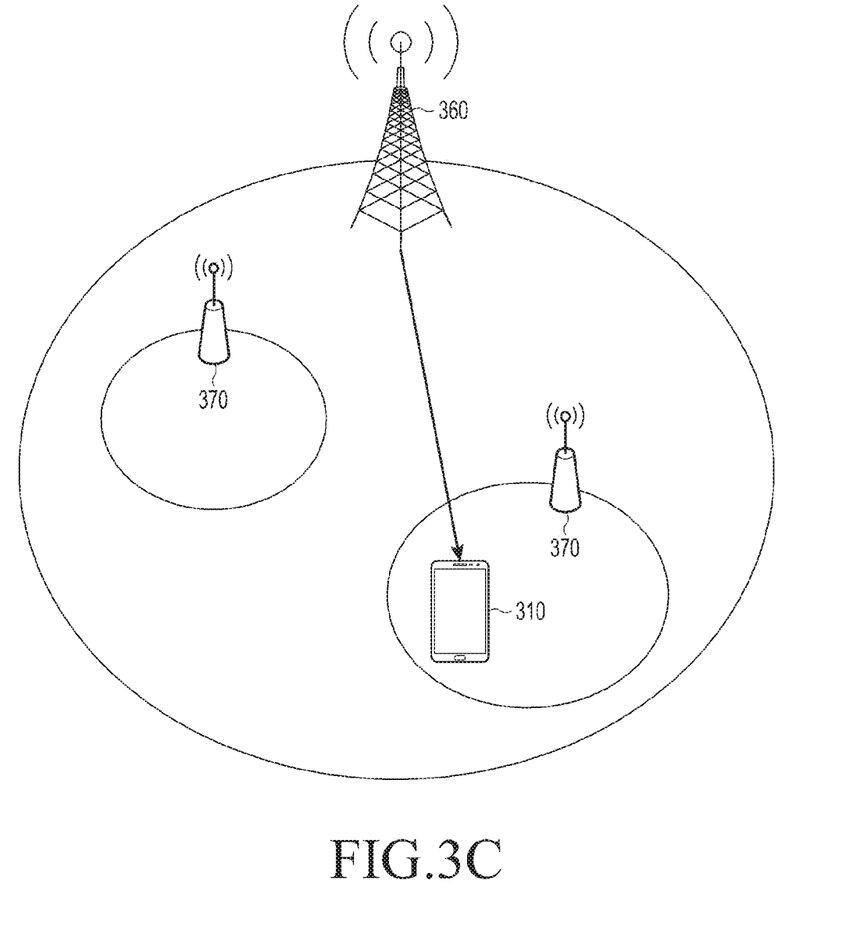
FIG. 3C illustrates an example of a communication system according to various embodiments of the present disclosure.

FIG. 3A is an example of a communication device 300 according to embodiments of the present disclosure; FIG. 3B is an example of a UE 310 having communication device 300 and being connected to other devices and a network according to embodiments of the present disclosure; and FIG. 3C is an example of UE 310 in a cellular communication system including a macro BS and smaller BSs according to embodiments of the present disclosure.

FIG. 3A illustrates an example of a communication device 300 according to various embodiments of the present disclosure. In FIG. 3A, the communication device 300 includes a transceiver 301, a processor 302, and a memory 303.

The transceiver 301 configures communication between, for example, the communication device 300 and an external device (for example, a first external electronic device 330, a second external electronic device 340, or a server 350 in FIG. 3B). As shown in FIG. 3B, the transceiver 370 is connected to network 320 through wireless communication or wired communication, so as to communicate with the second external device 340. Herein, "transceiver" is interchangeable with terms such as "communication module" and "communication interface".

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and Global System for Mobile Communications (GSM), as a cellular communication protocol. Further, the wireless communication may include, for example, short-range communication. The short-range communication may include at least one of, for example, Wi-Fi, Bluetooth, and Near Field Communication (NFC). The communication device 300 may also receive Global Navigation Satellite System (GNSS) signals, from GNSSs such as, for example, the U.S. Global Positioning System (GPS), the Russian Global Navigation Satellite System (GLONASS), the Chinese Global Navigation Satellite System (Beidou), and the European Global Satellite-based Navigation System (Galileo), according to a use area, a bandwidth, or the like. Hereinafter, in the present disclosure, "GPS" may be used interchangeably with the "GNSS". The wired communication may include at least one of, for example, a Universal Serial Bus (USB), a High Definition Multimedia Interface (HDMI), an RS-232 interface, and Plain Old Telephone Service (POTS).

According to various embodiments of the present disclosure, the processor 302 may include one or more of a Communication Processor (CP), a Central Processing Unit (CPU) and an Application Processor (AP). The processor 302 may carry out, for example, operations or data processing related to control and/or communication of at least one other element of the communication device 300. Herein, the term "processor" is interchangeable with terms such as "control module", "control unit", and "controller".

The memory 303 may include a volatile memory and/or a non-volatile memory. The memory 303 may store, for example, instructions or data related to at least one other element of the communication device 300. The memory 303 may store software and/or a program. The program may include, for example, a kernel, middleware, an Application Programming Interface (API), and/or an application program (or "application"). Although FIG. 3A illustrates that the memory 303 is included in the communication device 300, this is only an example; according to various embodiments of the present disclosure, the memory 303 may be omitted from the communication device 300.

FIG. 3B illustrates an example of UE 310 including communication device 300 according to various embodiments of the present disclosure. In FIG. 3B, UE 310 includes the communication device 300, a display 312, and an input/output interface 314. The communication device 300 is connected to network 320, which may be a communication network such as a computer network (for example, a Large Access Network (LAN), a Wide Area Network (WAN), the Internet, and/or a telephone network).

The display 312 may be, for example, a Liquid Crystal Display (LCD), a Light-Emitting Diode (LED) display, an Organic Light-Emitting Diode (OLED) display, a Micro-ElectroMechanical Systems (MEMS) display, and/or an electronic paper display. The display 312 may display, for example, various types of contents (for example, text, images, videos, icons, or symbols) for the user. The display 312 may include a touch screen and receive, for example, a touch input, a gesture input, a proximity input, or a hovering input using an electronic pen or a user's body part.

The input/output interface 314 serves as an interface that may transfer instructions or data, which is input from a user or another external device, to another element(s) of the UE 310. Further, the input/output interface 314 may output instructions or data received from another element(s) of the UE 310 to a user or another external device.

The server 350, connected to UE 310 through network 320, may include, for example, a Central Management Server (CMS). The CMS may include a server managed by a service operator (in other words, service provider). The CMS may include, for example, a server managed by a manufacturer of the UE 310 or a manufacturer of the communication device 300 (for example, model) included in the UE 310. The server 350 may include an information processor and a database. The server 350 may be connected to a macro BS (for example, macro BS 360 in FIG. 3C).

FIG. 3C illustrates an example of a communication system according to various embodiments of the present disclosure, which includes first BS 360 which may be, for example, a macro BS, two second BSs 370, which may be, for example, small cell stations (for example, femto cell stations), and UE 310. The UE 310 may receive information on the second BS 370 from the first BS 360. The communication system with one first BS 360, two second BSs 370, and UE 310 illustrated in FIG. 3C is only an example for describing the present disclosure, and it would be apparent to those of ordinary skill in the art that a communication system may have many more and possibly less such elements.

Figure 4:
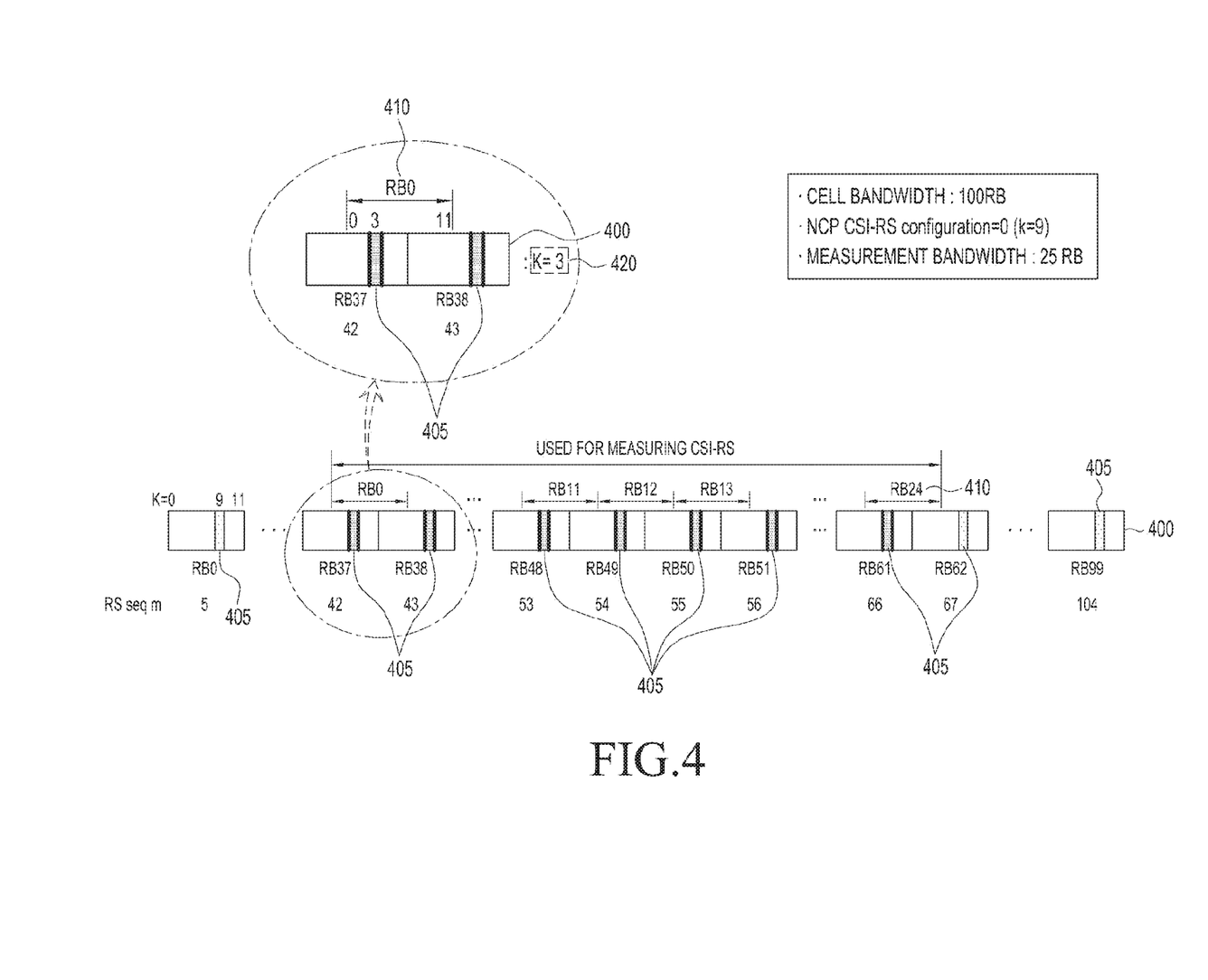
FIG. 4 illustrates an example of function/functions or operation/operations of measuring received power by using a CSI-RS acquired based on an alternative CSI-RS configuration according to various embodiments, of the present disclosure.
Figure 6:
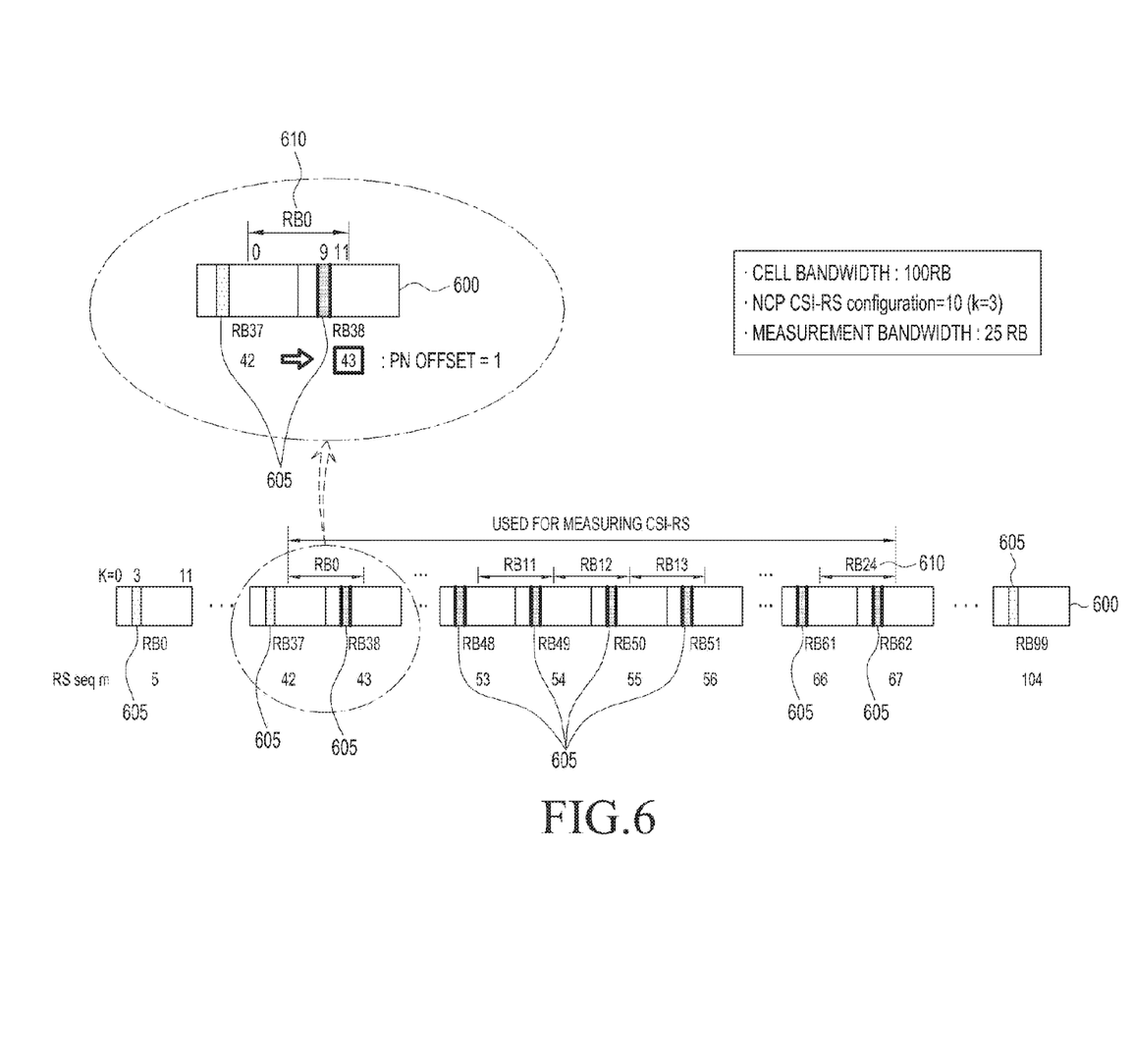
FIG. 6 illustrates an example of function/functions or operation/operations of measuring received power by acquiring the CSI-RS by using the alternative subcarrier offset and de-scrambling the CSI-RS acquired using the alternative subcarrier offset according to a shifted CSI-RS sequence according to various embodiments of the present disclosure.
Figure 7:
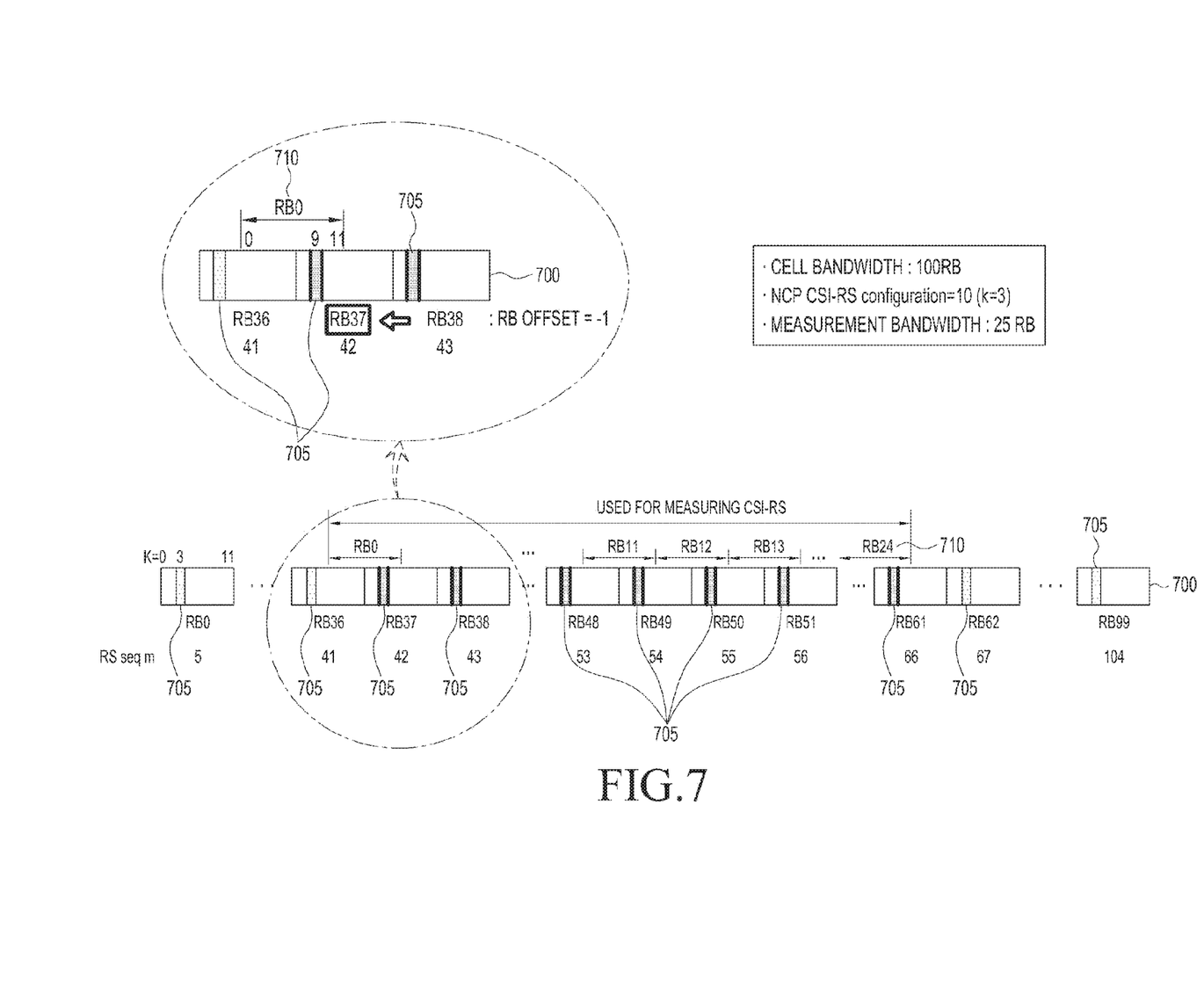
FIG. 7 illustrates an example of function/functions or operation/operations of measuring received power by acquiring a CSI-RS using the alternative subcarrier offset and an RB shift according to various embodiments of the present disclosure.

FIGS. 4, 6, and 7 illustrate examples of measuring received power according to various embodiments of the present disclosure. The received power measured according to the method illustrated in FIG. 4 is referred to as "second received power", the received power measured according to the method illustrated in FIG. 6 is referred to "third received power", and the received power measured according to the method illustrated in FIG. 7 is referred to as "fourth received power", while the received power measured according to the method illustrated in FIGS. 2A and 2B is referred to as "first received power". The terms first received power, second received power, third received power, and fourth received power are only examples for convenience of the description of the present disclosure, and the first received power, the second received power, the third received power, and the fourth received power may be the same value as each other or different values from each other. In the present disclosure, the first received power to the fourth received power include the same type of received power (for example, RSRP), but the first received power to the fourth received power may be different types of measuring received power according to various embodiments of the present disclosure.

FIG. 4 illustrates an example of function/functions or operation/operations of measuring received power by using a CSI-RS acquired based on a re-configured (alternative) CSI-RS configuration according to various embodiments of the present disclosure.

As described with reference to FIG. 2B, the subcarrier offset of the measurement bandwidth may be different from the subcarrier offset of the cell bandwidth actually acquired by the communication device 300 or the UE 310. Similarly, in FIG. 4, the subcarrier offset of measurement RBs 410 (i.e., k=3) is different than the subcarrier offset of cell RBs 400 (i.e., k=9) actually acquired by the communication device or UE.

Figure 5:
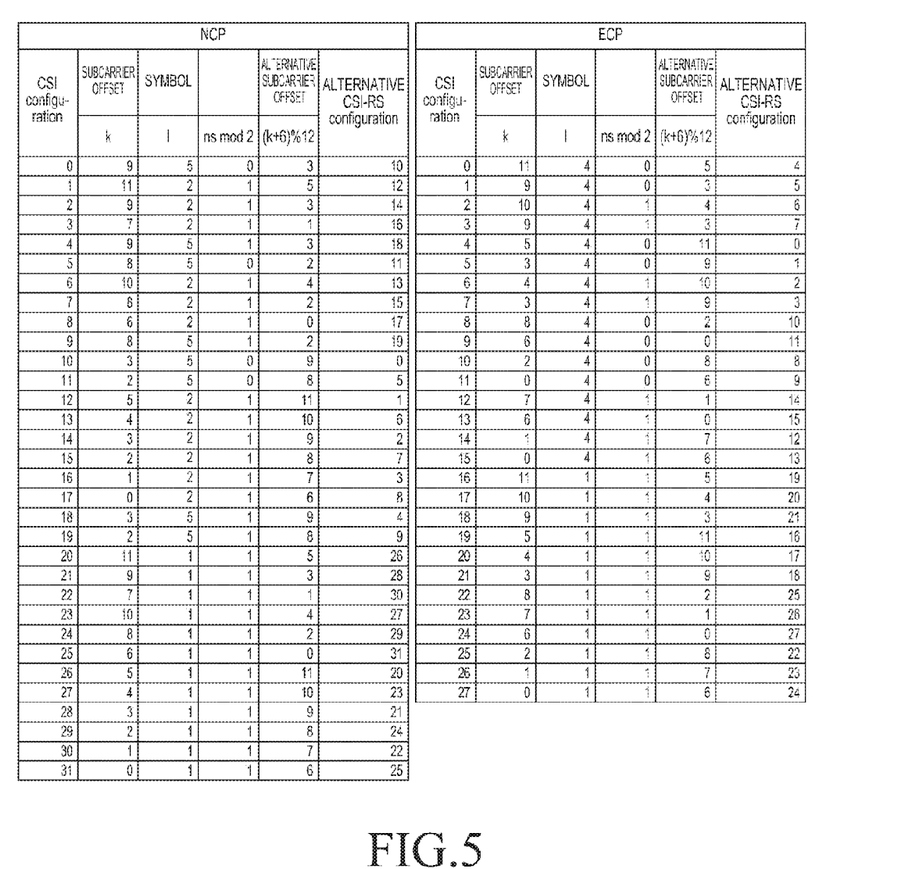
FIG. 5 is an example of a table for determining offsets, CSI-RS configurations, and alternative CSI-RS configurations according to various embodiments of the present disclosure.

According to various embodiments of the present disclosure, the subcarrier offset acquired from the first BS is re-configured according to, for example, the table in FIG. 5 and the CSI-RS is acquired according to the offset of the table. In FIG. 4, CSI-RS 405 is acquired at the position determined according to the re-configured (alternative) subcarrier offset 420 (that is, k=3 according to the ALTERNATIVE SUBCARRIER OFFSET column in FIG. 5). In one embodiment, the processor or controller of the communication device is configured to measure received power by using the CSI-RS acquired at the re-configured position.

According to various embodiments of the present disclosure, the second received power is measured when the subcarrier offset of the CSI-RS configuration received from the first BS is larger than, for example, 5. That is, the processor or controller of the communication device may measure each of the first received power and the second received power when the subcarrier offset is larger than 5. To this end, in certain embodiments, the processor is configured to determine whether the subcarrier offset has a value larger than 5. The processor may also be configured to compare sizes (or strengths or intensities) of the measured first received power and second received power and to determine the received power having a larger value as the valid received power. The term "alternative subcarrier offset" may be referred to as a term "symmetric subcarrier offset". Further, the term "alternative CSI-RS configuration" may be referred to as a term "symmetric CSI-RS configuration" or "second channel state information". In addition, in the present disclosure, the CSI-RS configuration acquired from the first BS may be referred to as the term "first channel state information".

FIG. 5 is an example of a table for determining offsets, CSI-RS configurations, and alternative CSI-RS configurations, according to various embodiments of the present disclosure. The table for determining the alternative subcarrier offsets as shown in FIG. 5 may be stored in memory 303 according to various embodiments of the present disclosure.

The alternative CSI-RS configuration is calculated based on the CSI-RS configuration provided from the first BS using Equation (1) below:

$$(k+6)\% \ 12 \tag{1}$$

where k is the subcarrier offset (for example, k in the table of FIG. 5) provided by the first BS and % is the modular operator.

FIG. 6 illustrates an example of function/functions or operation/operations of measuring received power by acquiring a CSI-RS by using an alternative subcarrier offset and de-scrambling the CSI-RS acquired using the alternative subcarrier offset according to a shifted CSI-RS sequence according to various embodiments of the present disclosure. In FIG. 6, the cell bandwidth is 100 RBs, the CP type is normal, the CSI-RS configuration is 10, and the measurement bandwidth is 25 RBs.

In FIG. 6, CSI-RS 605 is acquired by using the alternative subcarrier offset described with reference to FIG. 5 according to various embodiments of the present disclosure. Further, the received power is measured by using a sequence shifted according to a predetermined value and direction and the CSI-RS acquired using the alternative subcarrier offset. In this embodiment, the sequence shift is a shift of 1 in the positive direction (that is, the direction in which the sequence increases). As illustrated in FIG. 6, since the CSI-RS configuration received from the first BS is 10, the corresponding subcarrier offset is 3 (k=3). However, in terms of measurement RB0 610, the subcarrier offset is 9 (k=9) and the CSI-RS configuration corresponding to this subcarrier offset is 10. That is, in the row for CSI Configuration 10 in the table of FIG. 5, the ALTERNATIVE SUBCARRIER OFFSET value is 9. Depending on the circumstances, which circumstances do exist in FIG. 6, the CSI-RS corresponding to the alternative subcarrier offset (that is, k=9) may be located in the next cell bandwidth sequence (that is, sequence #43) rather than the initial cell bandwidth sequence (that is, sequence #42) of the cell RBs 600 corresponding to the start position of the initial measurement bandwidth RB #0 (or start RB) of the measurement RBs 610. In other words, measurement RB0 starts in sequence 42 and ends in sequence 43), and the offset may end up being in sequence 43, i.e., the end cell RB. In the present disclosure, the term "sequence shift" may also be referred to as "Pseudo Noise (PN) offset".

FIG. 7 illustrates an example of function/functions or operation/operations of measuring received power by using a CSI-RS acquired based on an RB shift according to various embodiments of the present disclosure.

In FIG. 7, CSI-RS 705 is acquired by simultaneously using the alternative subcarrier offset from the table of FIG. 5 and the RB shift of cell RBs 700 according to various embodiments of the present disclosure. In this embodiment, the RB shift (or "RB offset") is a shift of 1 in the negative direction (that is, the direction in which the sequence decreases). As illustrated in FIG. 7, since the CSI-RS configuration received from the first BS is 10, the corresponding subcarrier offset is 3. However, in terms of measurement RB #0 710, the subcarrier offset is 9. As illustrated in FIG. 7, the CSI-RS may be located before a cell RB (that is, RB #37) corresponding to the start position of the initial measurement RB (that is, RB #0). In the embodiment shown in FIG. 7, the received power is measured using CSI-RSs located at RB #37 to RB #61 of the cell bandwidth instead of CSI-RSs located at RB #38 to RB #62 of the cell bandwidth, as in FIG. 6. The RB shift may be referred to as the RB offset. In one embodiment, the processor in the communication device may be configured to measure received power by acquiring CSI-RSs corresponding to positions using both the alternative subcarrier offset and the RB offset.

According to various embodiments of the present disclosure, the third received power or the fourth received power is measured when the subcarrier offset of the CSI-RS configuration received from the first BS is less than or equal to, for example, 5. That is, when the subcarrier offset configured from the first BS is less than or equal to than 5, the first received power and the third received power may be measured, or the first received power and the fourth received power may be measured. To this end, in an embodiment, the processor in the communication device is configured to determine whether the subcarrier offset configured from the first BS has a value less than or equal to 5.

According to various embodiments of the present disclosure, the values of the measured first received power and third received power or values of the measured first received power and fourth received power may be compared to determine which received power is the valid received power. For example, the processor or controller of the communication device may be configured to compare the values of the measured first received power and third received power or the values of the measured first received power and fourth received power may be compared and the larger value may be determined as the valid received power.

Figure 8:
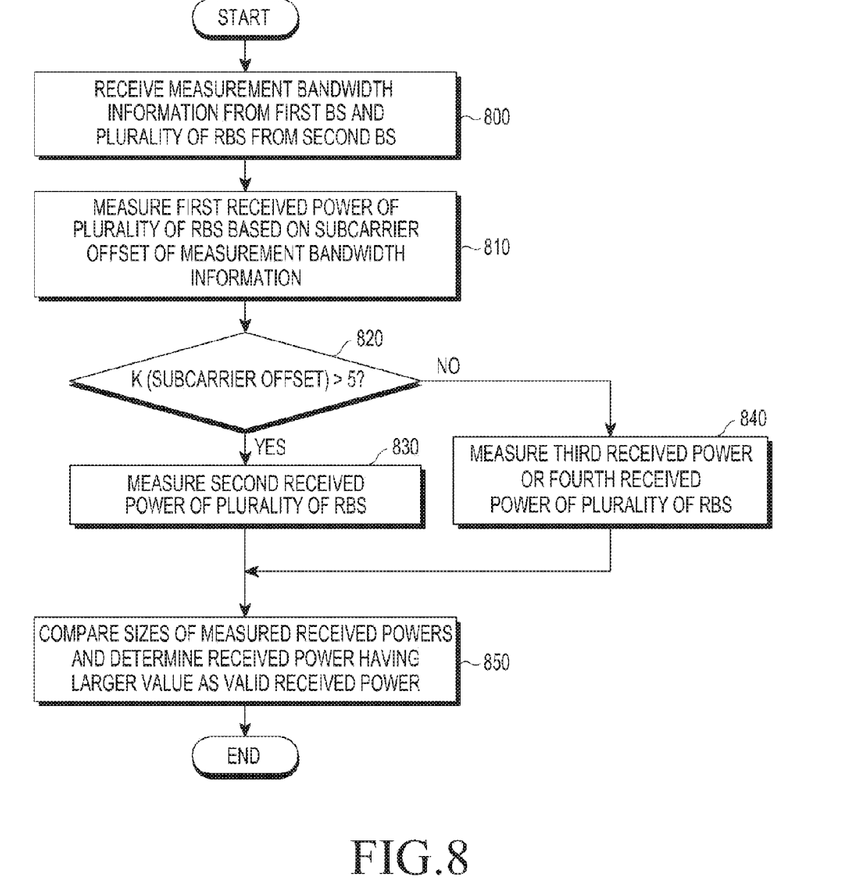
FIG. 8 is a flowchart of a method of determining received power according to various embodiments of the present disclosure described with reference to FIGS. 4 to 7.

FIG. 8 is a flowchart of a method of determining received power according to various embodiments of the present disclosure described with reference to FIGS. 4 to 7.

In step 800, first channel state information including measurement bandwidth information is received from a first BS and a plurality of RBs are received from a second BS. In step 810, the first received power of the plurality of RBs is measured according to a subcarrier offset configured from the first 13S.

In step 820, it is determined whether the subcarrier offset has a value greater than 5. If subcarrier offset has a value greater than 5, the second received power of the plurality of RBs is measured in step 830. If the subcarrier offset value is less than or equal to 5, the third received power or fourth received power of the plurality of RBs is measured.

After either measurement step 830 or measurement step 840, the values of the measured received powers are compared and the received power having the largest value is determined to be the valid received power in step 850.

Figure 9:
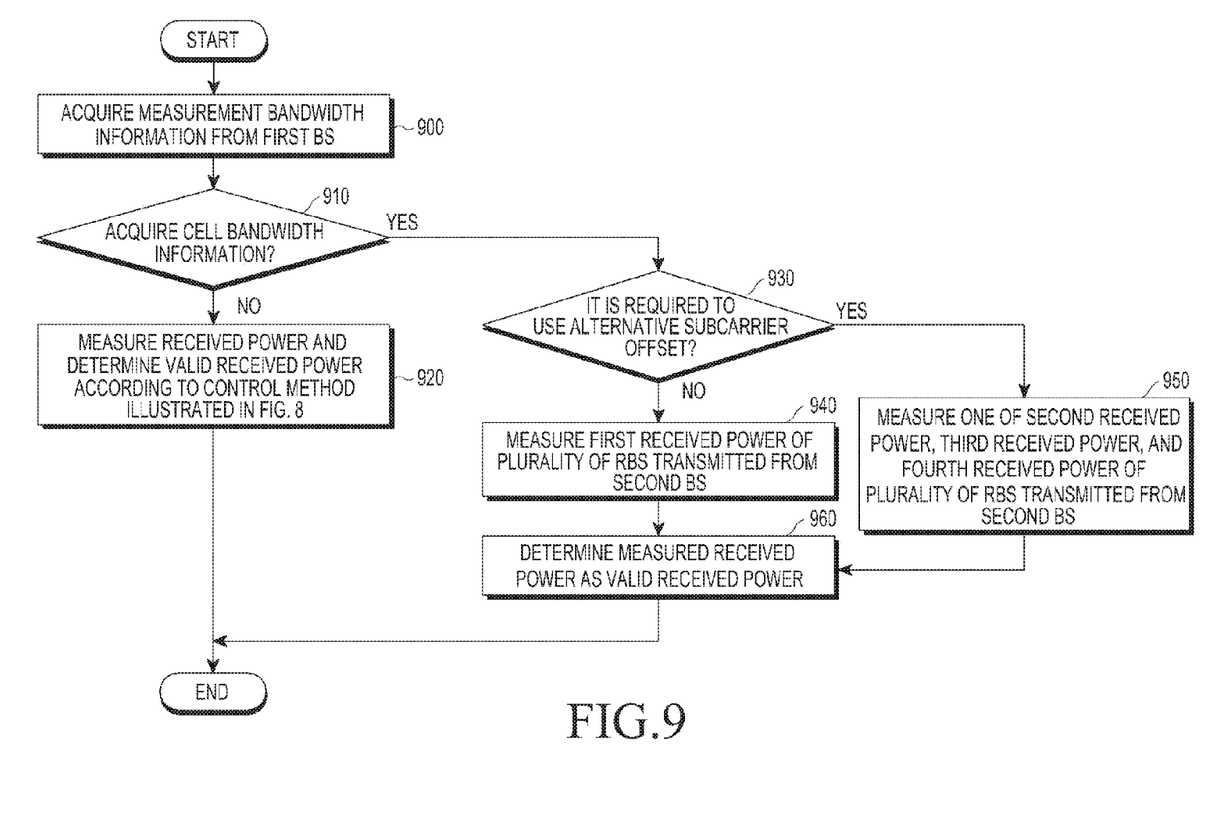
FIG. 9 is a flowchart of a method of measuring received power when information on a cell bandwidth is provided according to various embodiments of the present disclosure.

FIG. 9 is a flowchart of a method of measuring received power when information on a cell bandwidth (that is, cell bandwidth information) is provided to the communication device according to various embodiments of the present disclosure. Unlike the various embodiments of the present disclosure described above, in FIG. 9, cell bandwidth information may be provided to the device from, for example, the Central Management Server (CMS) or the Individual Data-Bak (IDB).

In step 900, measurement bandwidth information (for example, first channel state information) is acquired from a first BS (for example, a macro BS).

In step 910, it is determined whether the cell bandwidth information is acquired. In other embodiments, step 900 may include an operation of determining whether the cell bandwidth information becomes known to the communication device or the UE. If it is determined that the cell bandwidth information is not acquired in step 910, the received power may be measured according to the method described in FIG. 8.

If it is determined that the cell bandwidth information is acquired in step 910, it is determined whether it is required to use the alternative subcarrier offset based on the cell bandwidth information in step 930. Unlike the embodiment of FIG. 8, not only the measurement bandwidth information but also the cell bandwidth information is known to the UE/communication device in the embodiment of FIG. 9, so that step 930 can be performed. If the alternative subcarrier offset is not required in step 930, the first received power is measured in step 940 based on the measurement bandwidth information received from the first BS. One example of when there is no need to use the alternative subcarrier offset is the case where the cell bandwidth is 100 RBs and the measurement bandwidth is 6 RBs.

If the alternative subcarrier offset is required in step 930, the received power may be measured according to one of the methods of measuring second received power, third received power, and fourth received power determined based on the alternative subcarrier offset and the cell bandwidth information in step 950. One example of when there is a need to use the alternative subcarrier offset is the case where the cell bandwidth is 100 RBs and the measurement bandwidth is 25 RBs After either measurement step 940 or measurement step 950, the valid received power is determined in step 960 from the measured received values.

The term "module" as used herein may, for example, mean a unit including hardware, software, firmware, and/or a combination of two or more of them. The term "module" may be used interchangeably with, for example, the terms "unit", "logic", "logical block", "component", or "circuit". A "module" may be a minimum unit of an integrated component element or a part thereof, or a minimum unit for performing one or more functions or a part thereof. A "module" may be mechanically or electronically implemented. For example, a "module" according to the present disclosure may include at least one of an Application- Specific Integrated Circuit (ASIC) chip, a Field-Programmable Gate Arrays (FPGA), and a programmable-logic device for performing operations which has been known or are to be developed hereinafter.

According to various embodiments, at least some of the modules, functions, methods, operations, and the like according to the present disclosure may be implemented by means of instructions/commands/program(s) stored in a non-transitory computer-readable storage medium. These instructions/commands/program(s), when executed by a control module, processor, controller, and the like may cause the one or more components to execute the function corresponding to the instructions/commands/program(s). Memory 103 may be a non-transitory computer-readable storage medium storing such instructions/commands/program(s).

The non-transitory computer readable recoding medium may be a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), and/or a flash memory), and the like. In addition, the program instructions may include high level language codes, which can be executed in a computer by using an interpreter, as well as machine codes made by a compiler. The aforementioned hardware device may be configured to operate as one or more software modules in order to perform one or more operations of the present disclosure, and vice versa. Operations executed according to various embodiments of the present disclosure may be executed sequentially, in parallel, repeatedly, or in a heuristic manner. Further, some operations may be executed according to another order or may be omitted, or other operations may be added.

While the present disclosure has been shown and described with reference to various embodiments thereof, it will be understood by those skilled in the art that various changes in form and details may be made without departing from the spirit and scope of the present disclosure as defined by the appended claims and their equivalents.

What is claimed is:

1. A communication device that measures a valid received power even when a subcarrier offset of a measurement bandwidth is different from a subcarrier bandwidth of a cell bandwidth, the communication device comprising:
    a transceiver that receives first channel state information from a first Base Station (BS) and receives a plurality of Resource Blocks (RBs) from a second BS;
    a memory that stores the first channel state information and second channel state information, the second channel state information including an alternative index determined through a modular operation based on a value of an index included in the first channel state information; and
    a processor electrically connected to the transceiver and the memory,
    wherein the processor:
        measures a first received power of the plurality of RBs using the index included in the first channel state information,
        compares the value of the index included in the first channel state information to a predetermined value,
        measures another received power of the plurality of RBs from the second BS by using the alternative index included in the second channel state information, based on the comparison of the value of the index included in the first channel state information to the predetermined value, and
        determines a measured received power having a highest strength as the valid received power, and
    wherein the index and the alternative index include subcarrier offset (k) information on the plurality of RBs.

2. The communication device of claim 1, wherein the processor measures a second received power when the index value is larger than the predetermined value.

3. The communication device of claim 1, wherein the processor measures a third received power or a fourth received power when the index value is equal to or smaller than the predetermined value.

4. The communication device of claim 1, wherein the processor shifts sequences according to a predetermined value on the basis of a plurality of measurement RBs determined based on the first channel state information and measures a third received power by using channel state information reference signals (CSI-RSs) acquired based on the shifted sequences.

5. The communication device of claim 1, wherein the processor shifts the RBs according to a predetermined value on the basis of a plurality of measurement RBs determined based on the first channel state information and measures a fourth received power by using channel state information reference signals (CSI-RSs) acquired in the shifted RBs.

6. A method of a communication device that measures a valid received power even when a subcarrier offset of a measurement bandwidth is different from a subcarrier bandwidth of a cell bandwidth, the method comprising: measuring a first received power of a plurality of Resource Blocks (RBs) received from a second Base Station (BS) using an index included in first channel state information received from a first BS;
    comparing a value of the index included in the first channel state information to a predetermined value;
    measuring another received power of the plurality of RBs from the second BS by using an alternative index included in second channel state information, based on the comparison of the value of the index to the predetermined value, wherein the alternative index included in the second channel state information is determined through a modular operation based on the value of the index included in the first channel state information; and
    determining a measured received power having a highest strength as the valid received power,
    wherein the index and the alternative index include subcarrier offset (k) information on the plurality of RBs.

7. The method of claim 6, wherein a second received power is measured when the value of the index is larger than the predetermined value.

8. The method of claim 6, wherein a third received power or a fourth received power is measured when the value of the index is equal to or smaller than the predetermined value.

9. The method of claim 6, wherein sequences are shifted according to a predetermined value on the basis of sequences of a plurality of measurement RBs determined based on the first channel state information and a third received power is measured using channel state information reference signals (CSI-RSs) acquired based on the shifted sequences.

10. The method of claim 6, wherein the RBs are shifted according to a predetermined value on the basis of a plurality of measurement RBs determined based on the first channel state information and a fourth received power is measured using channel state information reference signals (CSI-RSs) acquired in the shifted RBs.

11. A method of a User Equipment (UE) including a communication device that measures a valid received power even when a subcarrier offset of a measurement bandwidth is different from a subcarrier bandwidth of a cell bandwidth, the method comprising:

measuring a first received power of a plurality of Resource Blocks (RBs) received from a second Base Station (BS) using an index included in first channel state information received from a first BS;

comparing a value of the index included in the first channel state information to a predetermined value;

measuring another received power of the plurality of RBs by using an alternative index included in second channel state information, based on the comparison of the value of the index included in the first channel state information to the predetermined value, wherein the alternative index included in the second channel state information is determined through a modular operation based on the value of the index included in the first channel state information; and determining a measured received power having a highest strength as the valid received power, wherein the index and the alternative index include subcarrier offset (k) information on the plurality of RBs.

12. The method of claim 11, wherein a second received power is measured when the index value is larger than the predetermined value.

13. The method of claim 11, wherein a third received power or a fourth received power is measured when the value of the index is equal to or smaller than the predetermined value.

14. The method of claim 11, wherein sequences are shifted according to a predetermined value on the basis of sequences of a plurality of measurement RBs determined based on the first channel state information and a third received power is measured using channel state information reference signals (CSI-RSs) acquired based on the shifted sequences.

* * * * *